UNITED STATES PATENT OFFICE.

JOSEPH DEINET, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ORANGE VAT-DYE.

957,040.  Specification of Letters Patent.  Patented May 3, 1910.

No Drawing. Application filed May 12, 1909, Serial No. 495,449. Renewed March 18, 1910. Serial No. 550,295.

*To all whom it may concern:*

Be it known that I, JOSEPH DEINET, citizen of the German Empire, residing at Elberfeld, Germany, have invented new and useful Improvements in Vat Coloring-Matter, of which the following is a specification.

My invention relates to the production of new anthracene derivatives. They are obtained by converting a triaminoanthraquinone into its tribenzoylated derivative. The reaction is carried out by treating a triaminoanthraquinone with benzoyl chlorid.

The new products are after being dried and pulverized colored powders practically insoluble in water, soluble in concentrated sulfuric acid with from a yellow to red color. They yield on treatment with hydrosulfite and caustic soda lye from orange to red vats suitable for dyeing and printing the textile fiber from yellow to red to brown shades. They also form valuable lakes.

In order to illustrate the new process I can proceed as follows, the parts being by weight:—10 parts of 1.2.4-triaminoanthraquinone are heated to boiling for about half an hour with 100 parts of nitrobenzene and 40 parts of benzoyl chlorid. The new condensation product crystallizes from the cooling liquid in the shape of orange crystals which are filtered off and dried. It is soluble in pyridin with an orange yellow color, in concentrated sulfuric acid with a dull orange color. By treatment with hydrosulfite and NaOH an orange-red vat is obtained which dyes cotton, wool or silk pure orange shades.

Other triaminoanthraquinones may be used *e. g.* the 1.4:5-triaminoanthraquinone (dyes red).

I claim:—

1. The herein-described new vat dyestuffs of the anthracene series which can be obtained from benzoyl chlorid and a triaminoanthraquinone, whose dyestuffs are, after being dried and pulverized, colored powders practically insoluble in water, soluble in concentrated sulfuric acid with a yellow to red color; giving from orange to red vats with hydrosulfite and caustic soda lye, which vats dye the textile fiber from yellow to red shades, substantially as described.

2. The herein-described new vat dyestuff of the anthracene series which is the 1.2.4-tribenzoyltriaminoanthraquinone, which dyestuff is, after being dried and pulverized, an orange powder which is soluble in pyridin with an orange-yellow color; soluble in concentrated sulfuric acid with a dull orange-red color; giving an orange-red vat with hydrosulfite and caustic soda lye, which vat dyes the textile fiber orange shades, substantially as described.

In testimony whereof I have hereunto set my hand in the presence of two subscribing witnesses.

JOSEPH DEINET. [L. S.]

Witnesses:
 OTTO KÖNIG,
 C. J. WRIGHT.